(12) United States Patent
Dezfulian et al.

(10) Patent No.: US 11,880,066 B2
(45) Date of Patent: Jan. 23, 2024

(54) PHOTONICS CHIPS WITH RETICLE STITCHING BY BACK-TO-BACK TAPERED SECTIONS

(71) Applicant: GlobalFoundries U.S. Inc., Malta, NY (US)

(72) Inventors: Kevin Dezfulian, Arlington, VA (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/847,399

(22) Filed: Jun. 23, 2022

(65) Prior Publication Data
US 2023/0417990 A1    Dec. 28, 2023

(51) Int. Cl.
*G02B 6/122* (2006.01)
*G02B 6/12* (2006.01)

(52) U.S. Cl.
CPC ......... *G02B 6/1228* (2013.01); *G02B 6/1223* (2013.01); *G02B 2006/12097* (2013.01)

(58) Field of Classification Search
CPC .................................................. G02B 6/1228
See application file for complete search history.

(56) References Cited

U.S. PATENT DOCUMENTS

| | | | |
|---|---|---|---|
| 9,086,387 B2 | 7/2015 | Assefa et al. | |
| 9,703,047 B2 * | 7/2017 | Painchaud | G02B 6/124 |
| 10,018,789 B2 * | 7/2018 | Wang | G02B 6/132 |
| 10,429,582 B1 * | 10/2019 | Bian | G02B 6/12002 |
| 10,816,726 B1 * | 10/2020 | Peng | G02B 6/3636 |
| 2011/0116741 A1 * | 5/2011 | Cevini | G02B 6/305 385/28 |
| 2018/0314151 A1 * | 11/2018 | Koch | B29D 11/00 |
| 2021/0278611 A1 | 9/2021 | Sahin et al. | |
| 2022/0043207 A1 | 2/2022 | Bian | |

OTHER PUBLICATIONS

Tae Joon Seok, Kyungmok Kwon, Johannes Henriksson, Jianheng Luo, and Ming C. Wu, "Wafer-scale silicon photonic switches beyond die size limit," Optica 6, 490-494 (2019).

(Continued)

*Primary Examiner* — Charlie Y Peng
(74) *Attorney, Agent, or Firm* — Thompson Hine LLP; Anthony Canale

(57) ABSTRACT

Structures including a waveguide core and methods of fabricating a structure including a waveguide core. The structure comprises a photonics chip including a first chip region, a second chip region, a first waveguide core in the first chip region, and a second waveguide core in the second chip region. The first chip region adjoins the second chip region along a boundary. The first waveguide core includes a first tapered section, and the second waveguide core includes a second tapered section positioned across the boundary from the first tapered section. The first tapered section has a first width dimension that increases with increasing distance from the boundary, and the second tapered section has a second width dimension that increases with increasing distance from the boundary.

20 Claims, 6 Drawing Sheets

(56) References Cited

OTHER PUBLICATIONS

Y. Zhang, K. Shang, Y. Zhang and S. J. Ben Yoo, "Low-Loss Wafer-Scale Silicon Photonic Interposer Utilizing Inverse-Taper Coupler," 2018 IEEE Photonics Conference (IPC), pp. 1-2, doi: 10.1109/IPCon.2018.8527256 (2018).

Richard J. Bojkoa), Jing Li, Li He, Tom Baehr-Jones, and Michael Hochberg, "Electron beam lithography writing strategies for low loss, high confinement silicon optical waveguides," Journal of Vacuum Science & Technology B, vol. 29, Issue 6, https://doi.org/10.1116/1.3653266 (Oct. 25, 2011).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," 2021 Optical Fiber Communications Conference and Exhibition (OFC), pp. 1-3, M5A.2 (2021).

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform, " 2021 Optical Fiber Communications Conference and Exhibition (OFC), 2021, pp. 1-3.

Dezfulian, Kevin K. et al., "Hybrid Edge Couplers With Layers in Multiple Levels" filed on Feb. 8, 2021 as a U.S. Appl. No. 17/169,971.

Bartlomiej Jan Pawlak, "Photonics Chips and Semiconductor Products Having Angled Optical Fibers" filed on Oct. 25, 2021 as a U.S. Appl. No. 17/510,329.

Bian, Yusheng, "Edge Couplers With Metamaterial Rib Features" filed on Jul. 7, 2021 as a U.S. Appl. No. 17/369,253.

Bian, Yusheng et al., "Spot-Size Converters With Angled Facets" filed on Feb. 24, 2022 as a U.S. Appl. No. 17/679,188.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng et al., "Optical Components in the Back-End-of-Line Stack of a Photonics Chip" filed on Jan. 12, 2021 as a U.S. Appl. No. 17/146,864.

Bian, Yusheng et al., "Edge Couplers in the Back-End-of-Line Stack of a Photonics Chip" filed on Jan. 19, 2021 as a U.S. Appl. No. 17/151,955.

Bian, Yusheng et al., "Edge Couplers in the Back-End-of-Line Stack of a Photonic Chip Having a Sealed Cavity" filed on Apr. 11, 2022 as a U.S. Appl. No. 17/658,821.

Bian, Yusheng, "Edge Couplers With Consecutively-Arranged Tapers" filed on Mar. 23, 2022 as a U.S. Appl. No. 17/701,918.

* cited by examiner

PHOTONICS CHIPS WITH RETICLE STITCHING BY BACK-TO-BACK TAPERED SECTIONS

BACKGROUND

The disclosure relates to photonics chips and, more specifically, to structures including a waveguide core and methods of fabricating a structure including a waveguide core.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A photonics chip may be formed by photolithography in which a reticle image is used in a step-and-repeat lithography tool for patterning the entire photonics chip. Portions of a photoresist layer on a substrate are incrementally exposed to a reticle pattern until the entire intended area of the photonics chip has been exposed. In this way, a single reticle can be used to create a large pattern of fields containing a repeated reticle pattern that is stitched together. Measures are needed to ensure that light can be efficiently transmitted between waveguide cores across each reticle boundary. Positional mismatches during reticle stitching can lead to misalignment of the waveguide cores at the reticle boundaries, which may result in significant performance degradation such as elevated insertion loss and increased back reflection.

Improved structures including a waveguide core and methods of fabricating a structure including a waveguide core are needed.

SUMMARY

In an embodiment of the invention, a structure comprises a photonics chip including a first chip region, a second chip region, a first waveguide core in the first chip region, and a second waveguide core in the second chip region. The first chip region adjoins the second chip region along a boundary. The first waveguide core includes a first tapered section, and the second waveguide core includes a second tapered section positioned across the boundary from the first tapered section. The first tapered section has a first width dimension that increases with increasing distance from the boundary, and the second tapered section has a second width dimension that increases with increasing distance from the boundary.

In an embodiment of the invention, a method comprises forming a first chip region of a photonics chip and forming a second chip region of the photonics chip that adjoins the first chip region of the photonics chip along a boundary. The first chip region includes a first waveguide core, and the first waveguide core includes a first tapered section. The second chip region includes a second waveguide core in the second chip region, and the second waveguide core includes a second tapered section positioned across the boundary from the first tapered section. The first tapered section has a first width dimension that increases with increasing distance from the boundary, and the second tapered section has a second width dimension that increases with increasing distance from the boundary.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
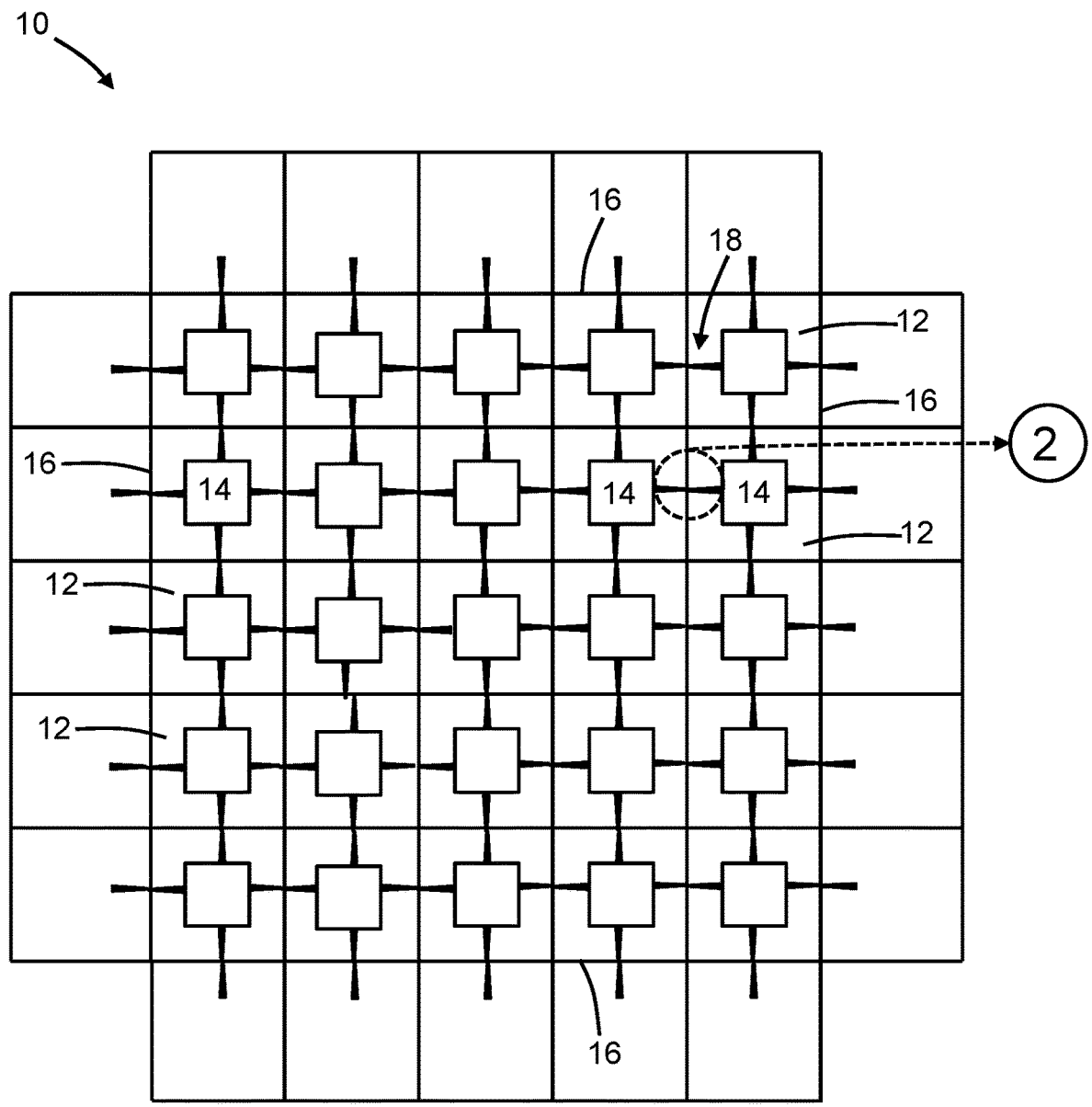
FIG. 1 is a top view of a photonics chip in accordance with embodiments of the invention.

With reference to FIGS. 1, 2, 3, 3A and in accordance with embodiments of the invention, a photonics chip 10 may include multiple chip regions 12 each including optical components, which are generally indicated by reference numeral 14. The optical components 14 may include, for example, modulators, splitters, and photodetectors that provide optical functions and that are connected by waveguide cores. In an embodiment, the optical components 14 in the different chip regions 12 may be identical in type and arrangement.

The chip regions 12 may be arranged in a two-dimensional array in which adjacent chip regions 12 adjoin along respective boundaries 16. The boundaries 16 define transitions between the different chip regions 12. Structures 18 may be provided at the boundaries 16 to transmit light across the boundaries 16 between chip regions 12. In an embodiment, one of the structures 18 may be provided at each of the boundaries 16 between adjacent pairs of the chip regions 12.

Each chip region 12 may be product of one or more reticle image patterns that are lithographically replicated over the area of the photonics chip 10 as part of the process flow to produce the multiple chip regions 12. The chip regions 12 have a periodicity equal to the periodicity of the reticle image patterns, which imparts a periodicity to the boundaries 16. In an embodiment, the periodicity of the structures 18 may be equal to the periodicity of the boundaries 16.

Figure 2:
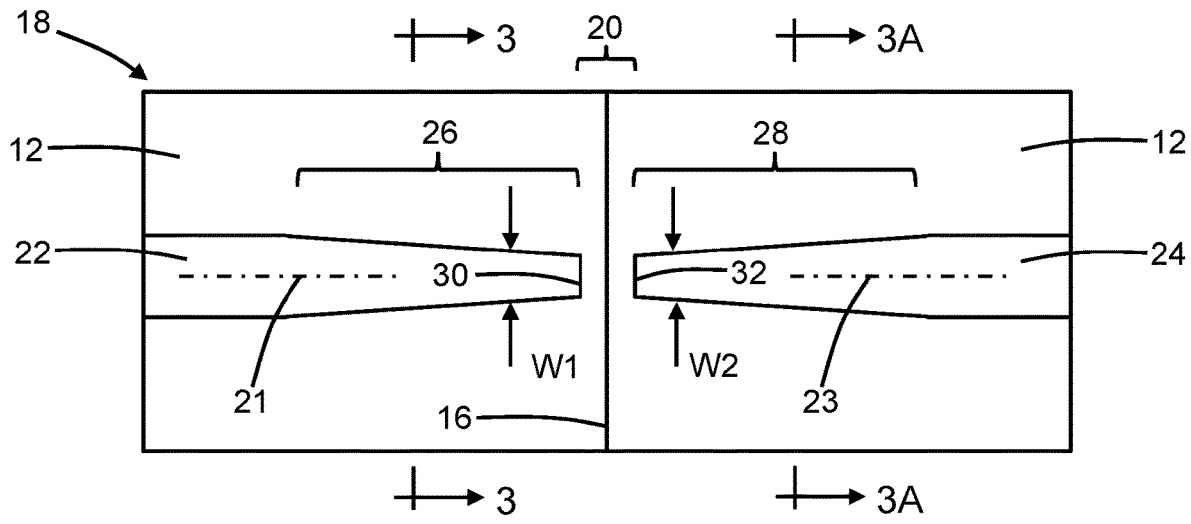
FIG. 2 is a top view of an enlarged portion of FIG. 1 denoted by the encircled 2.

At each boundary 16 and as best shown in FIG. 2, the structure 18 includes a waveguide core 22 in one chip region 12 and a waveguide core 24 in the adjacent chip region 12. The waveguide core 22 has a tapered section 26 and the waveguide core 24 has a tapered section 28 that is positioned across the boundary 16 from the tapered section 26 of the waveguide core 22. The tapered sections 26, 28 have a back-to-back (i.e., end-to-end) arrangement at the boundary 16. In an embodiment, for each structure 18, the waveguide core 22 includes a terminating end 30 and the waveguide core 24 includes a terminating end 32 that is positioned across the boundary 16 from the terminating end 30 of the waveguide core 22.

The waveguide core 22 has a width dimension W1, and the waveguide core 24 has a width dimension W2. The width dimension W1 of the tapered section 26 of the waveguide core 22 longitudinally increases with increasing distance from the terminating end 30 and the boundary 16. Similarly, the width dimension W2 of the tapered section 28 of the waveguide core 24 longitudinally increases with increasing distance from the terminating end 32 and the boundary 16. The width dimension W1 of the tapered section 26 and the width dimension W2 of the tapered section 28 change in opposite directions relative to the boundary 16. In an embodiment, the width dimension W1 of the tapered section 26 and the width dimension W2 of the tapered section 28 may increase linearly. In an alternative embodiment, the width dimension W1 of the tapered section 26 and the width dimension W2 of the tapered section 28 may increase based on a non-linear function, such as a quadratic function, a cubic function, a parabolic function, a sine function, a cosine function, a Bezier function, or an exponential function. In an embodiment, the tapered section 26 and the tapered section 28 may have equal taper angles defining the width dimension change with longitudinal position relative to the terminating ends 30, 32.

In the representative embodiment, the terminating end 30 of the waveguide core 22 is spaced from the terminating end 32 of the waveguide core 24 positioned across the boundary 16 by a gap 20. The gap 20 overlaps with the boundary 16 between the tapered section 26 of the waveguide core 22 and the tapered section 28 of the waveguide core 24. The waveguide cores 22, 24 may be aligned along respective longitudinal axes 21, 23. In the representative embodiment, the longitudinal axis 21 of the waveguide core 22 may be collinearly aligned with the longitudinal axis 23 of the waveguide core 24.

The waveguide cores 22, 24 may be positioned in a vertical direction over a dielectric layer 34 and a substrate 36. In an embodiment, the dielectric layer 34 may be comprised of a dielectric material, such as silicon dioxide, and the substrate 36 may be comprised of a semiconductor material, such as single-crystal silicon. In an embodiment, the dielectric layer 34 may be a buried oxide layer of a silicon-on-insulator substrate, and the dielectric layer 34 may separate the waveguide cores 22, 24 from the substrate 36. In an alternative embodiment, an additional dielectric layer comprised of, for example, silicon dioxide may separate the waveguide cores 22, 24 from the dielectric layer 34. In an alternative embodiment, the substrate 36 may include an undercut beneath one or both of the tapered sections 26, 28.

In an embodiment, the waveguide cores 22, 24 may be comprised of a material having a refractive index that is greater than the refractive index of silicon dioxide. In an embodiment, the waveguide cores 22, 24 may be comprised of a semiconductor material, such as single-crystal silicon. In an alternative embodiment, the waveguide cores 22, 24 may be comprised of a dielectric material, such as silicon nitride. In an alternative embodiment, the waveguide cores 22, 24 may be comprised of silicon oxynitride. In alternative embodiments, other materials, such as a polymer or a III-V compound semiconductor, may be used to form the waveguide cores 22, 24.

In an embodiment, the waveguide cores 22, 24 may be formed by patterning a layer of material with lithography and etching processes. In an embodiment, the waveguide cores 22, 24 may be formed by patterning the semiconductor material (e.g., single-crystal silicon) of a device layer of a silicon-on-insulator substrate. In an embodiment, the waveguide cores 22, 24 may be formed by patterning a deposited layer of a material (e.g., silicon nitride). In an embodiment, the tapered sections 26, 28 of the waveguide cores 22, 24 may be solid and continuous (i.e., non-segmented). The chip regions 12 are provided by discrete reticle images during lithography, and the different reticle images are stitched to form the photonics chip 10.

Figure 3:
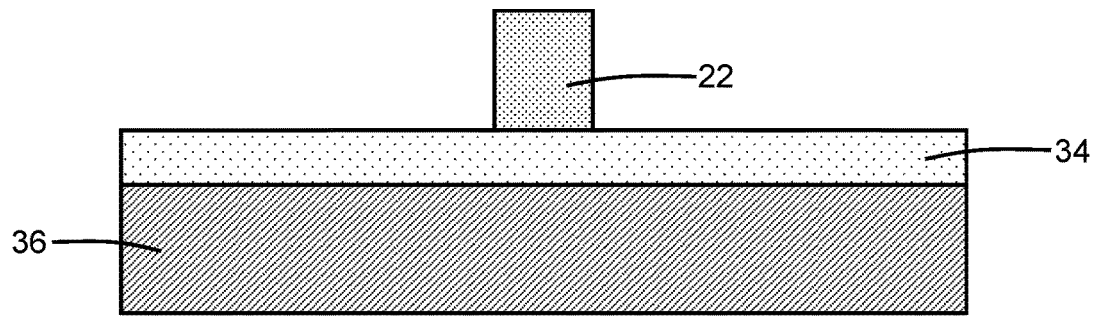
FIG. 3 is a cross-sectional view taken generally along line 3-3 in FIG. 2.
Figure 3A:
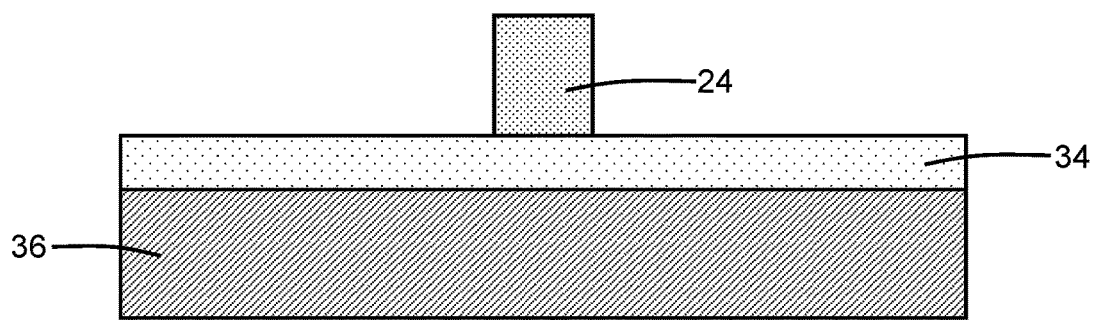
FIG. 3A is a cross-sectional view taken generally along line 3A-3A in FIG. 2.
Figure 4:
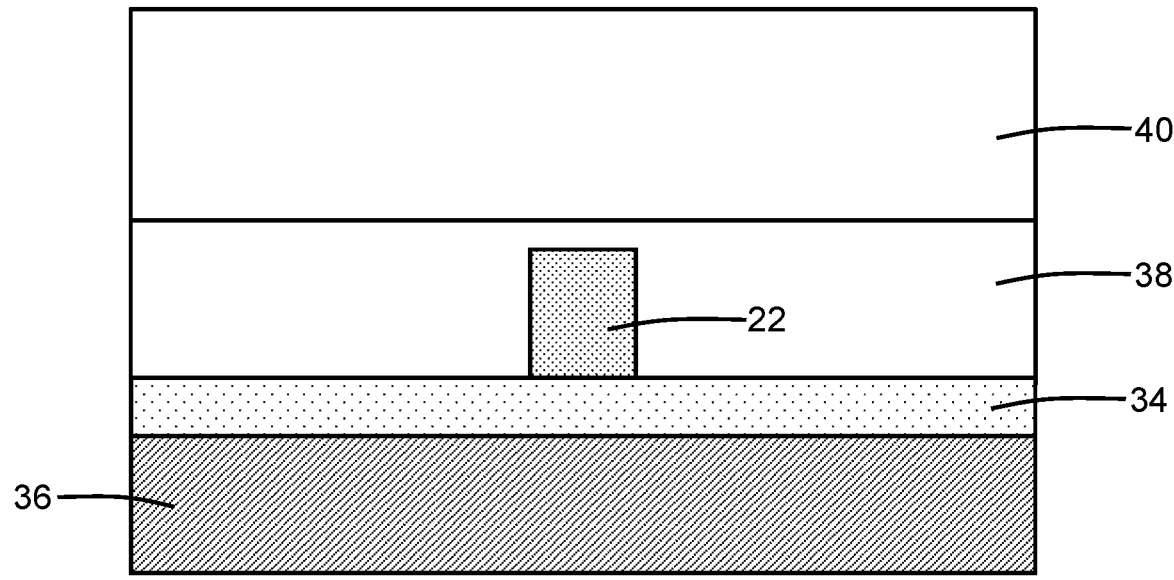
FIGS. 4, 4A are cross-sectional views at a fabrication stage subsequent to FIGS. 3, 3A.
Figure 4A:
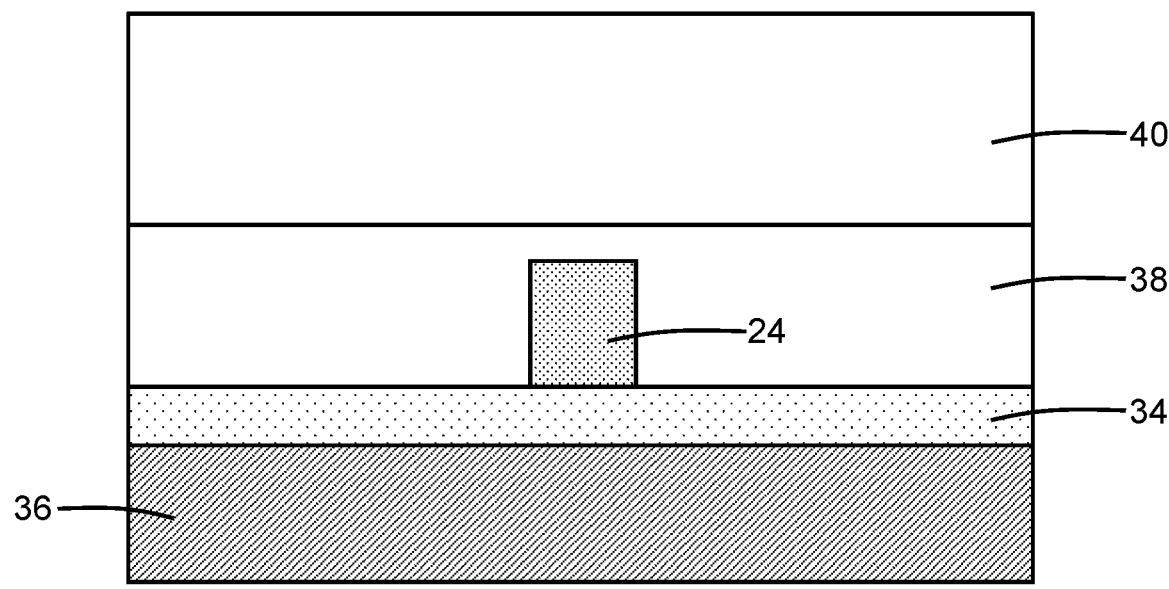

With reference to FIGS. 4, 4A in which like reference numerals refer to like features in FIGS. 3, 3A and at a subsequent fabrication stage, a dielectric layer 38 is formed over the waveguide cores 22, 24. The dielectric layer 38 may be comprised of a dielectric material, such as silicon dioxide, that is deposited and then planarized following deposition. In an embodiment, the waveguide cores 22, 24 may be embedded in the dielectric layer 38, which may be thicker than the waveguide cores 22, 24. The dielectric material constituting the dielectric layer 38 may have a refractive index that is less than the refractive index of the material constituting the waveguide cores 22, 24.

A back-end-of-line stack 40 may be formed over the dielectric layer 38. The back-end-of-line stack 40 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

The structure 18 may be effective to reduce the impact of reticle stitching mismatch by leveraging back-to-back tapered sections 26, 28 at the boundaries 16 of the chip regions 12 defined by different reticle images. For each structure 18, the tapered section 26 and tapered section 28 are configured to transfer light across the intervening boundary 16. The structures 18 may handle the transfer of light of increased optical mode size, in comparison with conventional structures, across each boundary 16. The structure 18 may be more tolerant to misalignment, such as a gap and/or a lateral offset between the tapered section 26 of the waveguide core 22 and the tapered section 28 of the waveguide core 24, resulting from reticle stitching mismatch.

Figure 5:
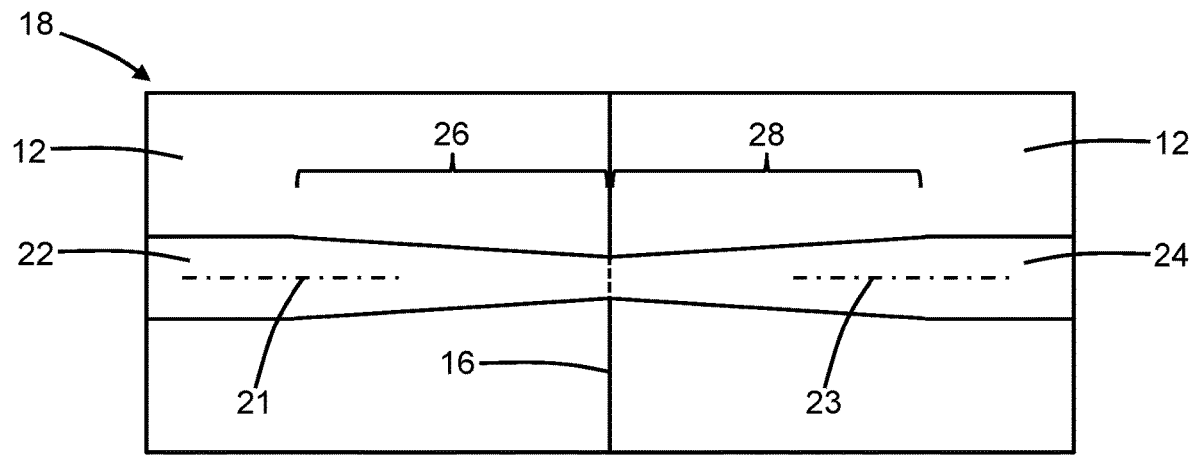
FIG. 5 is a top view of a structure in accordance with alternative embodiments of the invention.

With reference to FIG. 5 and in accordance with alternative embodiments of the invention, the tapered section 26 of the waveguide core 22 may abut or adjoin the tapered section 28 of the waveguide core 24 at the intervening boundary 16 such that the gap 20 (FIG. 2) is absent. In the non-spaced relationship, the tapered section 26 of the waveguide core 22 may be continuous with the tapered section 28 of the waveguide core 24.

Figure 6:
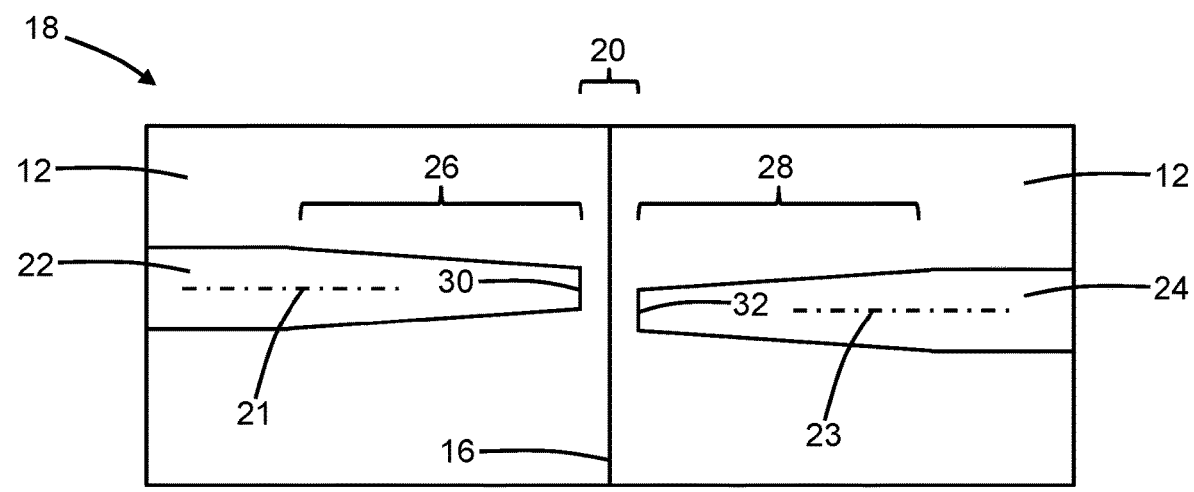
FIGS. 6, 6A are top views of structures in accordance with alternative embodiments of the invention.
Figure 6A:
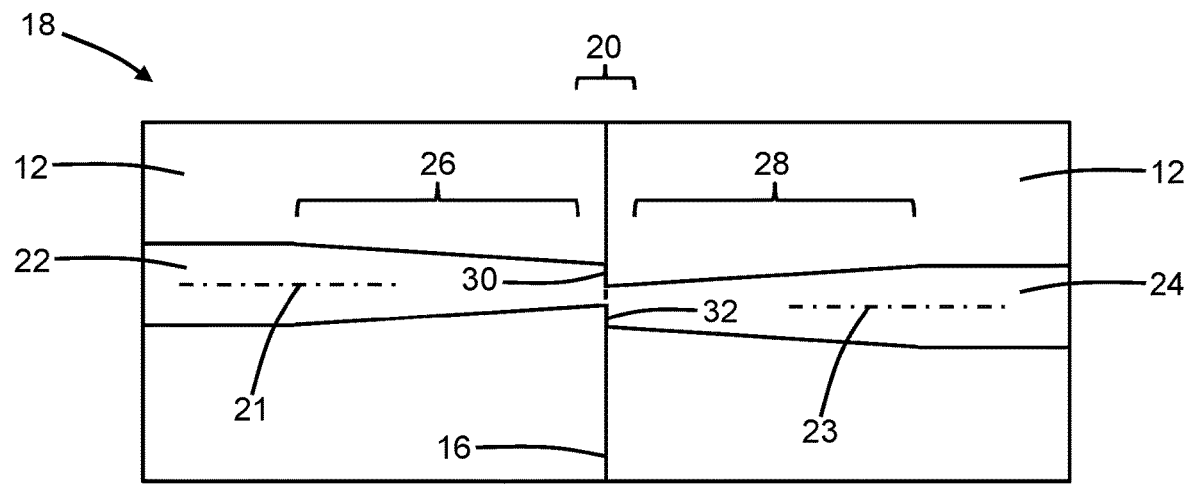

With reference to FIGS. 6, 6A and in accordance with alternative embodiments of the invention, the longitudinal axis 21 of the waveguide core 22 may be laterally offset from the longitudinal axis 23 of the waveguide core 24. As a result, the longitudinal axis 21 is not collinearly aligned with the longitudinal axis 23. Instead, the longitudinal axis 21 may be aligned parallel to the longitudinal axis 23 due to the lateral offset. In an alternative embodiment, the tapered section 26 of the waveguide core 22 may abut or adjoin the tapered section 28 of the waveguide core 24, as shown in FIG. 6A, in addition to the lateral offset.

Figure 7:
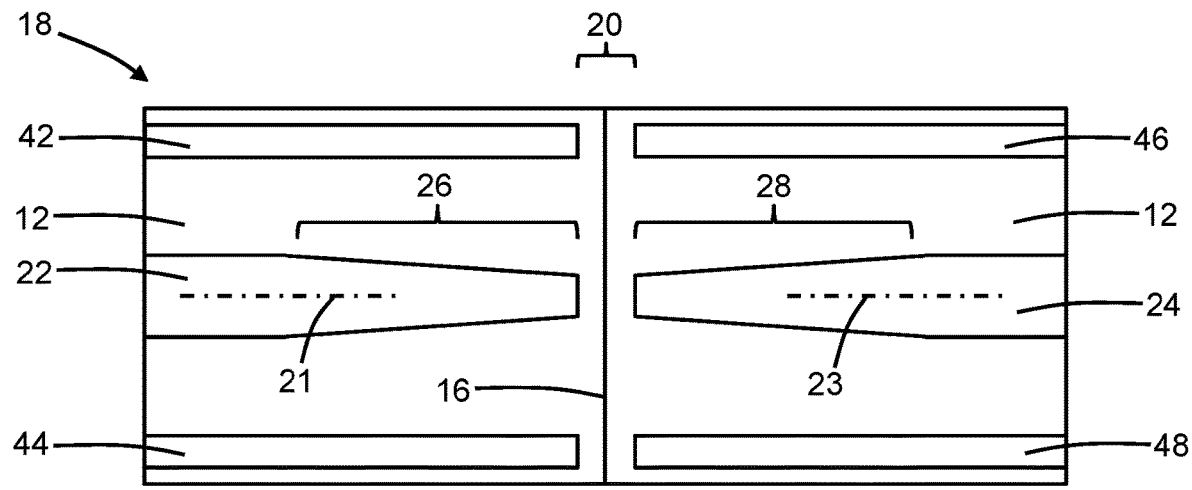
FIG. 7 is a top view of a structure in accordance with alternative embodiments of the invention.

With reference to FIG. 7 and in accordance with alternative embodiments of the invention, the structure 18 may include additional waveguide cores 42, 44 that are positioned adjacent to the waveguide core 22, and additional waveguide cores 46, 48 that are positioned adjacent to the waveguide core 24. In an embodiment, the waveguide cores 42, 44 and the waveguide cores 46, 48 may be comprised of the same material as the waveguide cores 22, 24. The added waveguide core 42 is positioned across the boundary 16 from, and adjacent to, the added waveguide core 46 in an end-to-end relationship, and the added waveguide core 42 may be longitudinally aligned and in a spaced relationship with the waveguide core 46. The added waveguide core 44 is positioned across the boundary 16 from, and adjacent to, the added waveguide core 48 in an end-to-end relationship, and the waveguide core 44 may be longitudinally aligned and in a spaced relationship with the waveguide core 48. In alternative embodiments, the waveguide core 42 may abut or adjoin the waveguide core 46, and the waveguide core 44 may abut or adjoin the waveguide core 48 in conjunction with abutment between the tapered sections 26, 28 of the waveguide cores 22, 24, as shown in FIG. 5. In alternative embodiments, the waveguide core 42 may be laterally offset relative to the waveguide core 46, and the waveguide core 44 may be laterally offset relative to the waveguide core 48 in conjunction with a lateral offset between the waveguide cores 22, 24, as shown in FIG. 6.

Figure 8:
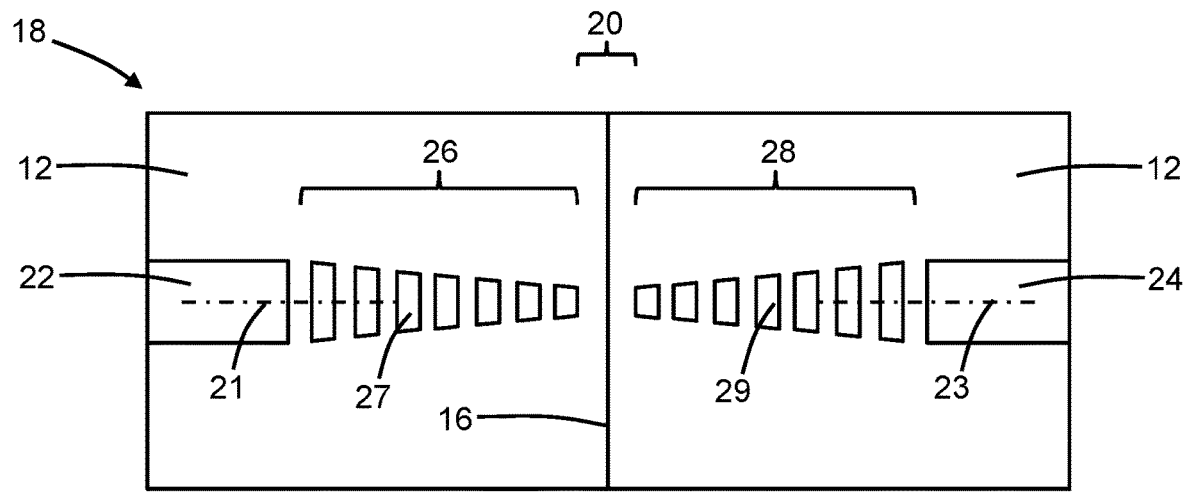
FIG. 8 is a top view of a structure in accordance with alternative embodiments of the invention.

With reference to FIG. 8 and in accordance with alternative embodiments of the invention, the tapered section 26 of the waveguide core 22 and the tapered section 28 of the waveguide core 24 may each be segmented such that the structure 18 includes metamaterial structures. Specifically, the tapered section 26 of the waveguide core 22 may be divided into segments 27 that are distributed in a spaced arrangement along the longitudinal axis 21, and the tapered section 28 of the waveguide core 24 may be divided into segments 29 that are distributed in a spaced arrangement along the longitudinal axis 23. In an embodiment, the pitch and duty cycle of the segments 27 and/or the segments 29 may be uniform to define a periodic arrangement. In alternative embodiments, the pitch and/or the duty cycle of the segments 27 and/or the segments 29 may be apodized (i.e., non-uniform) to define a non-periodic arrangement. The segments 27 and the segments 29 may be dimensioned and positioned at small enough pitch so as to define sub-wavelength grating-like structures.

The dielectric layer 38, which is formed over the waveguide cores 22, 24, is disposed in the gaps between adjacent pairs of the segments 27 and in the gaps between adjacent pairs of the segments 29. In an embodiment, the dielectric material of the dielectric layer 38 may fully fill the gaps. The segments 27 and the dielectric material of the dielectric layer 38 in the gaps between adjacent pairs of segments 27 may define a metamaterial structure in which the material constituting the segments 27 has a higher refractive index than the dielectric material of the dielectric layer 38. The segments 29 and the dielectric material of the dielectric layer 38 in the gaps between adjacent pairs of segments 29 may define a metamaterial structure in which the material constituting the segments 29 has a higher refractive index than the dielectric material of the dielectric layer 38. The metamaterial structures can be treated as homogeneous materials each having an effective refractive index that is intermediate between the refractive index of the material constituting the segments 27, 29 and the refractive index of the dielectric material of the dielectric layer 38.

Figure 9:
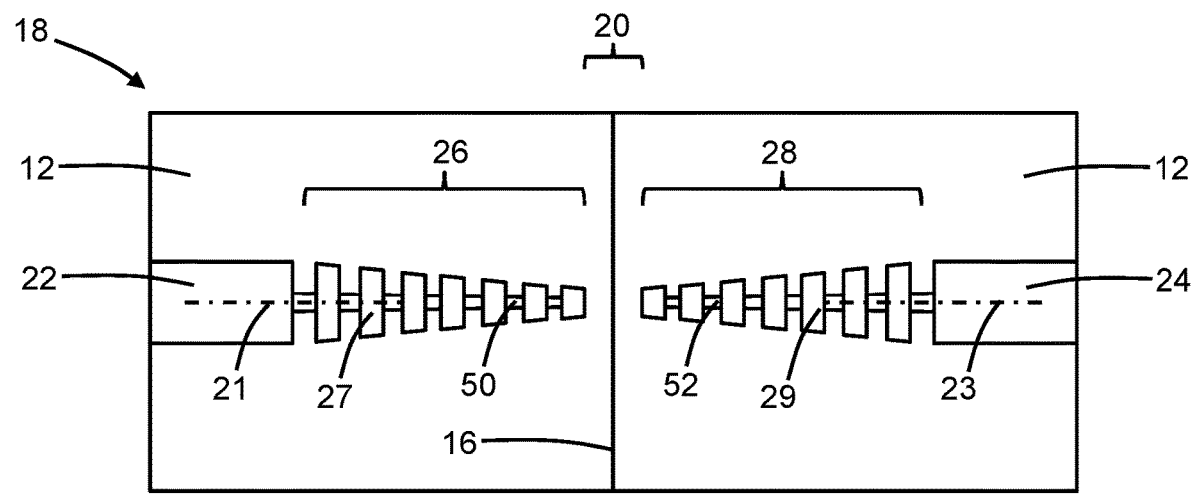
FIG. 9 is a top view of a structure in accordance with alternative embodiments of the invention.

With reference to FIG. 9 and in accordance with alternative embodiments of the invention, a rib 50 may be formed that is overlaid on the segments 27 of the tapered section 26, and another rib 52 may be formed that is overlaid on the segments 29 of the tapered section 28. In an embodiment, the rib 50 may be tapered to change in width dimension in the same direction relative to the boundary 16 as the width dimension of the segments 27, and the rib 52 may be tapered to change in width dimension in the same direction relative to the boundary 16 as the width dimension of the segments 29.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A structure comprising:
a photonics chip including a first chip region, a second chip region, a first waveguide core in the first chip region, and a second waveguide core in the second chip region, the first chip region adjoining the second chip region along a boundary, the first waveguide core including a first tapered section, the second waveguide core including a second tapered section positioned across the boundary from the first tapered section, the first tapered section having a first width dimension that increases with increasing distance from the boundary, and the second tapered section having a second width dimension that increases with increasing distance from the boundary, wherein the first tapered section is laterally offset relative to the second tapered section, the first tapered section has a first longitudinal axis, the second tapered section has a second longitudinal axis that is aligned parallel to the first longitudinal axis, and the first tapered section abuts the second tapered section at the boundary.

2. The structure of claim 1 wherein the photonics chip further includes a third waveguide core adjacent to the first tapered section of the first waveguide core and a fourth waveguide core adjacent to the second tapered section of the second waveguide core, and the third waveguide core is positioned across the boundary from the fourth waveguide core.

3. The structure of claim 1 wherein the first tapered section includes a first plurality of segments having a first spaced arrangement along the first longitudinal axis, and the second tapered section includes a second plurality of segments having a second spaced arrangement along the second longitudinal axis.

4. The structure of claim 3 wherein the first waveguide core further includes a first rib overlaid with the first plurality of segments, and the second waveguide core further includes a second rib overlaid with the second plurality of segments.

5. The structure of claim 3 wherein the first plurality of segments are separated by a first plurality of gaps, the second plurality of segments are separated by a second plurality of gaps, a dielectric material is positioned in the first plurality of gaps and the second plurality of gaps, the first plurality of segments and the second plurality of segments comprise a first material having a first dielectric constant, and the dielectric material comprises a second material having a second dielectric constant that is less than the first dielectric constant.

6. The structure of claim 5 wherein the first plurality of segments and the dielectric material define a first metamaterial structure, and the second plurality of segments and the dielectric material define a second metamaterial structure.

7. The structure of claim 1 wherein the first chip region includes a first plurality of optical components coupled to the first waveguide core, the second chip region includes a second plurality of optical components coupled to the second waveguide core, and the second plurality of optical components are identical to the first plurality of optical components.

8. The structure of claim 1 wherein the first tapered section is configured to transfer light from the first waveguide core to the second tapered section of the second waveguide core at the boundary.

9. The structure of claim 1 wherein the first tapered section is solid, and the second tapered section is solid.

10. The structure of claim 1 wherein the first waveguide core and the second waveguide core comprise silicon.

11. The structure of claim 1 wherein the first waveguide core and the second waveguide core comprise silicon nitride.

12. The structure of claim 1 wherein the first width dimension increases linearly with increasing distance from the boundary, and the second width dimension increases linearly with increasing distance from the boundary.

13. The structure of claim 1 wherein the first width dimension and the second width dimension increase based on a non-linear function.

14. The structure of claim 1 wherein the first tapered section and the second tapered section have equal taper angles.

15. The structure of claim 1 wherein the first waveguide core and the second waveguide core comprise a material having a refractive index that is greater than a refractive index of silicon dioxide.

16. The structure of claim 1 wherein the photonics chip includes a substrate and a dielectric layer, the dielectric layer is disposed between the first waveguide core and the substrate, and the dielectric layer is disposed between the second waveguide core and the substrate.

17. A method comprising:
forming a first chip region of a photonics chip, wherein the first chip region includes a first waveguide core having a first tapered section; and
forming a second chip region of the photonics chip that adjoins the first chip region of the photonics chip along a first boundary, wherein the second chip region includes a second waveguide core having a second tapered section positioned across the first boundary from the first tapered section, the first tapered section has a first width dimension that increases with increasing distance from the first boundary and, the second tapered section has a second width dimension that increases with increasing distance from the first boundary,
wherein the first tapered section is laterally offset relative to the second tapered section, the first tapered section has a first longitudinal axis, the second tapered section has a second longitudinal axis that is aligned parallel to the first longitudinal axis, and the first tapered section abuts the second tapered section at the first boundary.

18. The method of claim 17 wherein the first chip region and the second chip region are a product of one or more reticle image patterns that are lithographically replicated over an area of the photonics chip, the first chip region includes a first plurality of optical components coupled to the first waveguide core, the second chip region includes a second plurality of optical components coupled to the second waveguide core, and the second plurality of optical components are identical to the first plurality of optical components.

19. The method of claim 17 further comprising:
forming a third chip region of the photonics chip that adjoins the first chip region of the photonics chip along a second boundary,
wherein the third chip region includes a third waveguide core having a third tapered section, the first chip region includes a fourth waveguide core having a fourth tapered section, and the fourth tapered section is positioned across the second boundary from the third tapered section.

20. The method of claim 17 wherein the first chip region and the second chip region are formed by discrete reticle images during lithography, and the reticle images are stitched to form the photonics chip.

* * * * *